Patented July 30, 1929.

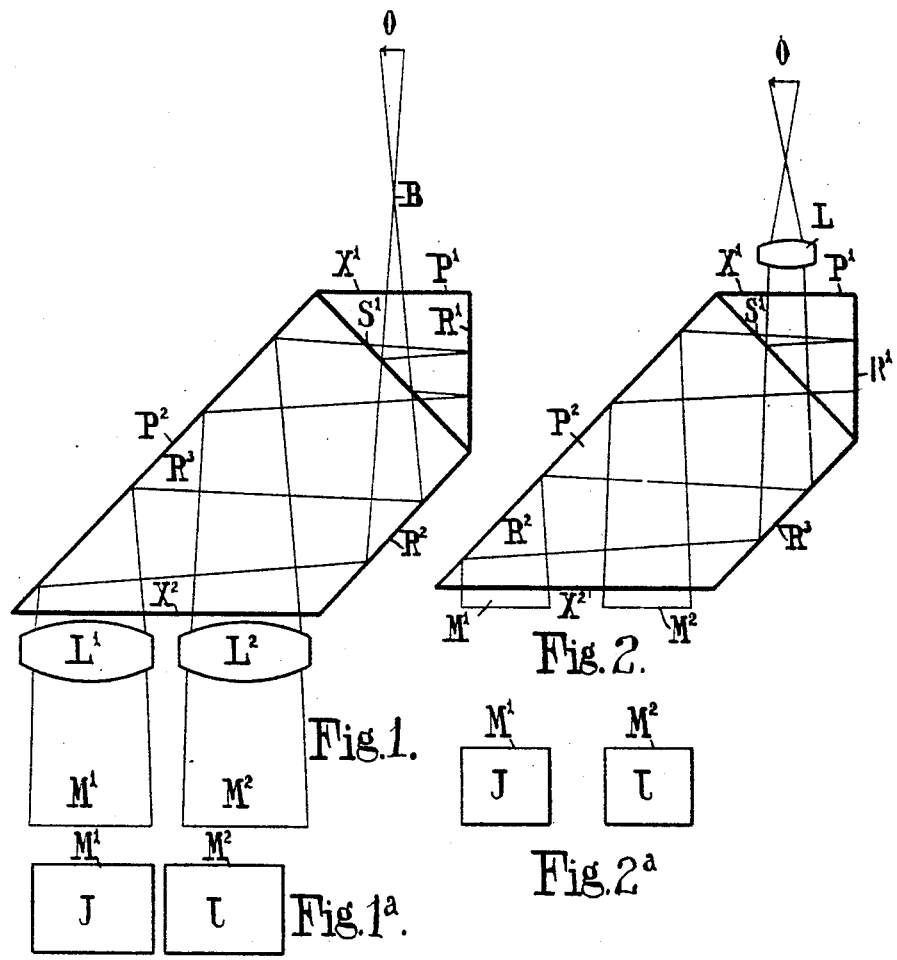

1,722,357

UNITED STATES PATENT OFFICE.

JAMES FREDERICK ROMER, OF WEST HAMPSTEAD, LONDON, ENGLAND, ASSIGNOR TO JOHN EDWARD THORNTON, OF LONDON, ENGLAND.

OPTICAL DEVICE FOR PHOTOGRAPHIC, CINEMATOGRAPHIC, AND OTHER PURPOSES.

Application filed March 31, 1927, Serial No. 180,028, and in Great Britain May 28, 1926.

This invention relates to improved optical apparatus for photographic, cinematographic, and other purposes.

*General description.*

The primary object of the invention is to form a plurality of images arranged or disposed in adjacent areas of the same plane, the said images being of the same object, from the same point of view, and therefore all alike as regards size, outline and details, such plurality of images being produced by this optical apparatus and a lens or lenses in conjunction with a camera upon a sensitized photographic plate or film or continuous cinematographic film.

The images so produced are all complementary to each other, and though of identical size and outline can be rendered different from each other by interposing suitable color filters in the paths of the light-beams.

By such means color-component images can be formed upon a sensitive surface to represent a group of two colors, such as orange-red and blue-green; or a group of three colors, such as red, blue and green; or a group of four colors, such as red, green, violet and yellow. Any other suitable combination of color components may be adopted. The invention can also be used for producing plurality-image groups of monochrome character known as two-tone or double-tone.

The plurality of images of the original scene produced by this optical device can be combined into a single image which may be utilized in either of the two following ways.

In the first method a group of component negative images produced by the apparatus upon plates or films can be recombined to form an enlarged positive picture by projecting them in superimposition upon a screen, by the aid of suitable projection apparatus, correct illumination of the plate or film, correct filters and the optical apparatus and lens or lenses, all used in combination. Such enlarged positive will be of the type technically termed "additive."

In the second method a group of component positives are printed from the component negatives, and the positives are then combined by cementing them together, producing a single positive of the type technically termed "subtractive."

The optical apparatus which forms the subject matter of this invention is designed to be used in producing any of the beforementioned types of plates or films in which it is necessary to obtain reversed or complementary images.

In such processes if it is desired for example to superimpose the color records in such a manner that the gelatine films are enclosed between their supporting celluloid bases, and if when the color records are made the separate gelatine films both face the incident light with the celluloid bases behind, then it is necessary for correct superimposition in order to avoid separating any of the gelatine films from its supporting celluloid base in the process of printing a positive from a negative film by contact, that the images which form the pictures on one film should be reversed laterally, or be complementary to those on the other film, or the images on one film should be the reflection of the images on the other film as seen in a plane mirror, and it is the object of the present invention to provide improved means whereby such complementary images may be produced simultaneously in the same focal plane from a single source of light.

In carrying out my invention I make use of the well known physical properties of the reflection of light from a totally reflecting surface combined with the reflection from and transmission through a surface which partly transmits and partly reflects for the purpose of dividing the incident beam of light into two parts. In order that the images on one film shall be reversed relatively to those on the other film, I arranged my apparatus so that the number of reflections undergone by one beam of light is one more than those undergone by the other beam of light, the essential characteristics of my invention being, that both the beams of light produced by dividing the original incident beam are transmitted through a semi-reflecting, semi-transmitting surface.

In the accompanying drawings which illustrate the invention Figs. 1 and 2 show various forms which the apparatus may take, those shown by Figs. 1 and 2 being the forms which I prefer to use and Figs. 1ᵃ and 2ᵃ the images produced.

Referring to Figs 1 and 2 which show the arrangements of apparatuses which are preferred, P¹ and P² represent prisms of transparent material cemented together at and enclosing the semi-transmitting, semi-reflecting surface $S^1$, $L^1$, and $L^2$ represent lenses which may be any kind of lenses capable of forming a real image, but are preferably properly compensating photographic objectives, and $M^1$, $M^2$ represent the images produced, which are also shown in Figs. 1a and 2a.

Referring more particularly to Fig. 1 the beam of light B from the object O incident upon the surface $X^1$ is transmitted to the semi-transmitting, semi-reflecting surface $S^1$ set at an angle of approximately 45° to the axial ray of the incident beam where it is divided into two beams, one of which is transmitted to the totally reflecting surface $R^2$ set at right angles to the surface $S^1$, reflected on to the totally reflecting surface $R^3$ arranged parallel with the surface $R^2$ from whence it is reflected, emerging at the surface $X^2$, and after transmission through lens $L^1$ is focussed and forms the image $M^1$; the other beam is reflected from the semi-transmitting, semi-reflecting surface $S^1$ on to the totally reflecting surface $R^1$ arranged parallel with the axial ray of the incident beam from whence it is reflected and after passing through the semi-transmitting, semi-reflecting surface $S^1$ is reflected from the totally reflecting surface $R^3$, emerges at the surface $X^2$ and after transmission through lens $L^2$ is focussed and forms the image $M^2$.

The apparatus shown in Fig. 2 is similar to that shown in Fig. 1, but instead of having two lenses placed behind the composite prismatic block only one lens placed between the object and the first surface $X^1$ is used. This arrangement of apparatus is suitable for use when it is desired to use a lens of long focus, the arrangement shown in Fig. 3 being suitable for use when it is desired to use lenses of comparatively short focus; otherwise the mode of operation is precisely similar in both cases. Light from the object O, (Fig. 2) after transmission through lens L, is incident on the surface $X^1$ and after transmission to the semi-transmitting, semi-reflecting surface $S^1$ is divided into two parts, one part being transmitted, and reflected from the totally reflecting surfaces $R^3$ and $R^2$ and forming the image $M^1$; the other part being reflected from the semi-transparent, semi-reflecting surface $S^1$ on to the totally reflecting surface $R^1$ from whence it is reflected, passing through the semi-transmitting, semi-reflecting surface $S^1$ and after reflection from the totally reflecting surface $R^2$ emerges at $X^2$ and forms the image $M^2$.

Suitable color filters to extract any desired color may be arranged between the prisms and the sensitive surface on which the images are formed. In the case of the arrangement shown in Fig. 1, such color screens may be either in front of or behind the lens.

What I claim as my invention and desire to protect by Letters Patent is:—

1. Optical apparatus for producing simultaneously two complementary images comprising in combination a semi-transmitting, semi-reflecting surface set at an angle of approximately 45° to the axial ray of the incident beam of light to divide the incident beam into two beams, a totally reflecting surface to receive the beam passing through the semi-transparent surface and reflect it at right angles, a second totally reflecting surface parallel with the first to reflect the beam into a line parallel with the incident beam, and a totally reflecting surface parallel with the incident beam to reflect back the part of the beam reflected by the semi-transmitting, semi-reflecting surface on to the said semi-transmitting, semi-reflecting surface, the portion passing through the surface striking the second mentioned totally reflecting surface and being reflected into a line parallel with the incident beam.

2. Optical apparatus for producing simultaneously two complementary images comprising a right angled prism, a semi-reflecting, semi-transmitting surface along the hypothenuse of the prism and a totally reflecting surface on one of the other sides thereof, a second prismatic block including two right angles, two parallel sides and having a base parallel to one side of the first mentioned prism cemented thereto, the axial ray of the incident beam striking one side of the first prism normally, being divided into two by the semi-reflecting semi-transparent surface, one beam passing through the surface impinging upon one of the parallel sides of the second prism at an angle of approximately 45° being reflected thereby on to the second parallel side and reflected therefrom parallel to the incident beam and the second beam being reflected by the surface on to the totally reflecting surface of the first prism reflected therefrom back to the surface the beam passing therethrough impinging upon the second parallel side of the second prism at an angle of approximately 45° thereto and being reflected into a line parallel with the incident beam.

In testimony whereof I have hereunto set my hand.

JAMES FREDERICK ROMER.